May 7, 1968

W. J. HAMPSHIRE 3,382,129

APPARATUS FOR FORMING FIBER REINFORCED RESINOUS MATERIAL

Filed April 13, 1965

INVENTOR.
WILLIAM J. HAMPSHIRE
BY
*H H Oldham*
ATTORNEY

May 7, 1968  W. J. HAMPSHIRE  3,382,129
APPARATUS FOR FORMING FIBER REINFORCED RESINOUS MATERIAL
Filed April 13, 1965  5 Sheets-Sheet 3
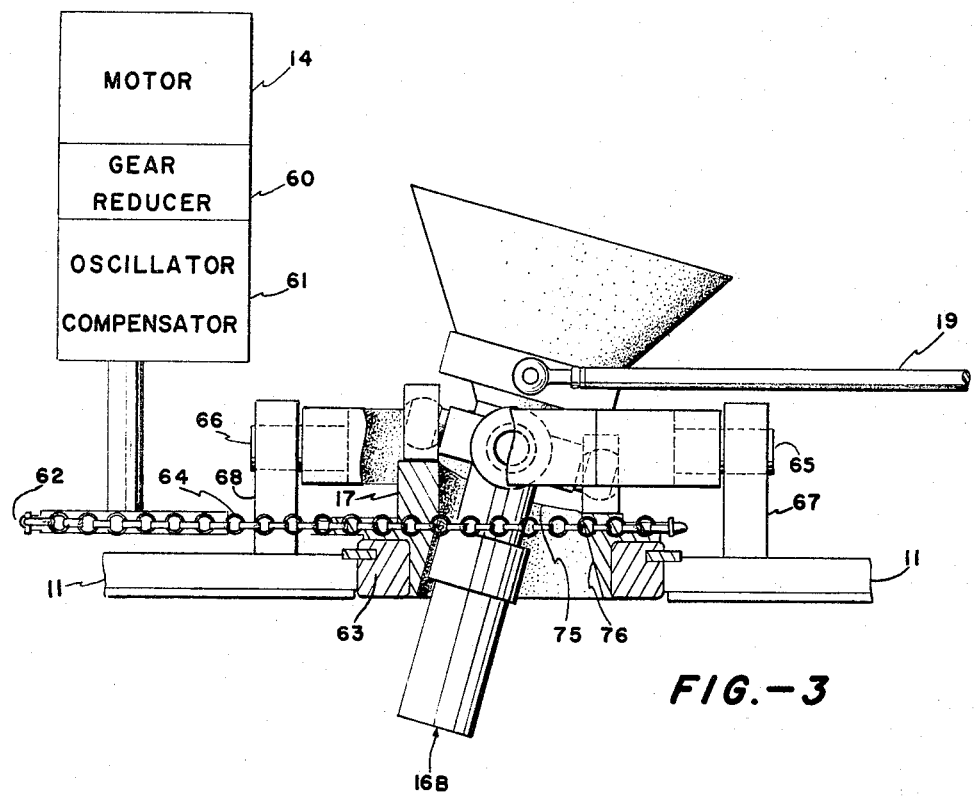
FIG.-3
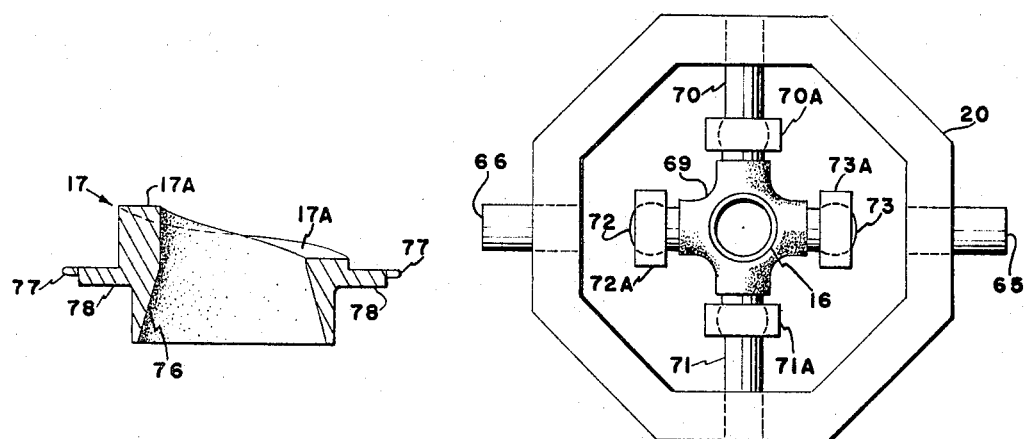
FIG.-5
FIG.-4
INVENTOR.
WILLIAM J. HAMPSHIRE
BY
*H H Oldham*
ATTORNEY May 7, 1968  W. J. HAMPSHIRE  3,382,129
APPARATUS FOR FORMING FIBER REINFORCED RESINOUS MATERIAL
Filed April 13, 1965  5 Sheets-Sheet 4

INVENTOR.
WILLIAM J. HAMPSHIRE
BY
*A H Oldham*
ATTORNEY

May 7, 1968 W. J. HAMPSHIRE 3,382,129
APPARATUS FOR FORMING FIBER REINFORCED RESINOUS MATERIAL
Filed April 13, 1965 5 Sheets-Sheet 5

INVENTOR.
WILLIAM J. HAMPSHIRE
BY
ATTORNEY

United States Patent Office 3,382,129
Patented May 7, 1968

3,382,129
APPARATUS FOR FORMING FIBER REINFORCED RESINOUS MATERIAL
William J. Hampshire, Cuyahoga Falls, Ohio, assignor to Goodyear Aerospace Corporation, Akron, Ohio, a corporation of Delaware
Filed Apr. 13, 1965, Ser. No. 447,793
9 Claims. (Cl. 156—372)

ABSTRACT OF THE DISCLOSURE

A multiple nozzle apparatus for forming a fiber reinforced resinous material utilizing nozzles to spray a mixture of resin and glass fibers in criss-crossing, uniformly oriented patterns to thereby create a fabric-like consistency of the fibers within the resinous mixture. The nozzles are mounted in longitudinally aligned relationship with a moving conveyor in a gimbaled mount with a cam relationship of the gimbaled mount to provide the desired tilting and closed geometric path movement of the tips of the nozzles upon rotation of the cam because of the gimbaled mounting of the nozzles. This feature provides closed geometric patterns of a mixture of resin and glass fibers to provide an interwoven-type relationship of the patterns as they are laid down onto a moving surface.

---

This invention relates to a multiple nozzle apparatus for forming a fiber reinforced resinous material, and more particularly to a unique apparatus utilizing nozzles to spray a mixture of resin and glass fibers in crisscrossing uniformly orientated patterns to thereby create a fabric-like consistency of the fibers within the resinous mixture.

Heretofore, it has been well known in plastic and thermosetting resin molding techniques that the inclusion of a fiberglass fabric impregnated with an epoxy, plastic, or thermosetting resin substantially increases the strength of the structure. Some attempts have been made with selective cure systems utilizing pre-mixes with short lengths of glass fibers in the mix being molded to the desired shape. For example, see Patent No. 2,498,785. However, an improved fiber reinforced material is shown and described in my co-pending patent application entitled, "Fiber Reinforced Material and Method for Making Thereof," filed May 6, 1965, and given Ser. No. 453,592. The apparatus described and set forth hereinafter may be used to manufacture the material set forth in the above-identified patent application.

Therefore, it is the general object of the present invention to meet the needs of forming the material set forth in the above-identified patent application and to provide an improvement over the deficiencies in the prior art by providing an apparatus utilizing a plurality of nozzles adapted to spray intermixed fibers and resin in interconnected diamond-shaped crisscrossing patterns thereby forming a resinous material of fabric-like consistency.

A further object of the invention is to provide an apparatus incorporating a unique arrangement directing a plurality of nozzles to lay down sequentially advancing and interconnected diamond-shaped patterns of resin and elongated glass fibers onto a moving conveyor belt.

A further object of the invention is to provide an apparatus incorporating a plurality of nozzles moved by a unique cam arrangement into substantially diamond or square-shaped patterns relative to a moving conveyor belt to form interconnected and crisscross patterns of ribbons of resin containing elongated glass fibers orientated therein, wherein the movement of the nozzles is controlled at a constant speed along each leg of the square or diamond-shaped pattern to insure an even build up of the material being formed.

A further object of the invention is to provide an apparatus capable of making the improved fiber reinforced material set forth in my above-identified patent application which apparatus is simple, highly effective, inexpensive and quite adjustable.

The aforesaid objects of the invention and other objects which will become apparent as the description proceeds are achieved by providing in an apparatus for forming fiber reinforced material the combination of a base frame, a conveyor belt associated with the base frame, means to move the conveyor belt relative to the base frame, nozzle means, gimbal mounting means operatively secured to the frame and mounting the nozzle means in gimbal relationship over the conveyor belt, means to supply resin under pressure to the nozzle means, means to supply air under pressure to the nozzle means, means to supply selectively cut elongated lengths of glass fibers to the nozzle means, and means to controllably move the nozzles relative to the conveyor belt while the belt is being moved relative to the base frame to direct ribbons of resin having elongated glass fibers orientated therein along continuous advancing similar diamond-shaped patterns to lay a substantially flat layer of intermixed resin and fibers on the conveyor belt which has a fabric-like consistency because the fibers are substantially orientated in crisscrossed relationship.

For a better understanding of the invention reference should be had to the accompanying drawings wherein:

FIGURE 3 is an enlarged partially broken away elevational view of the gimbal mounting of one of the nozzle assemblies;

FIGURE 4 is a broken away plan view of the gimbal mounting of FIGURE 3 in partial section;

FIGURE 5 is a vertical cross sectional elevation of the cam utilized in combination with the gimbal mounting of the nozzle of FIGURE 3;

While it should be understood that the apparatus of the invention might be properly utilized to spray and form any material utilizing particular related patterns of the sprayed material, it has been particularly designed and adapted to spray resin streams having elongated fibers substantially oriented therein to form a fiber reinforced resinous material having fabric-like consistencies which might be sprayed to the desired form, or sprayed into block form for subsequent molding to the desired form, or sprayed in association with a foaming resin to provide a fiber reinforced resinous foam material having fabric-like consistency.

Figure 1:
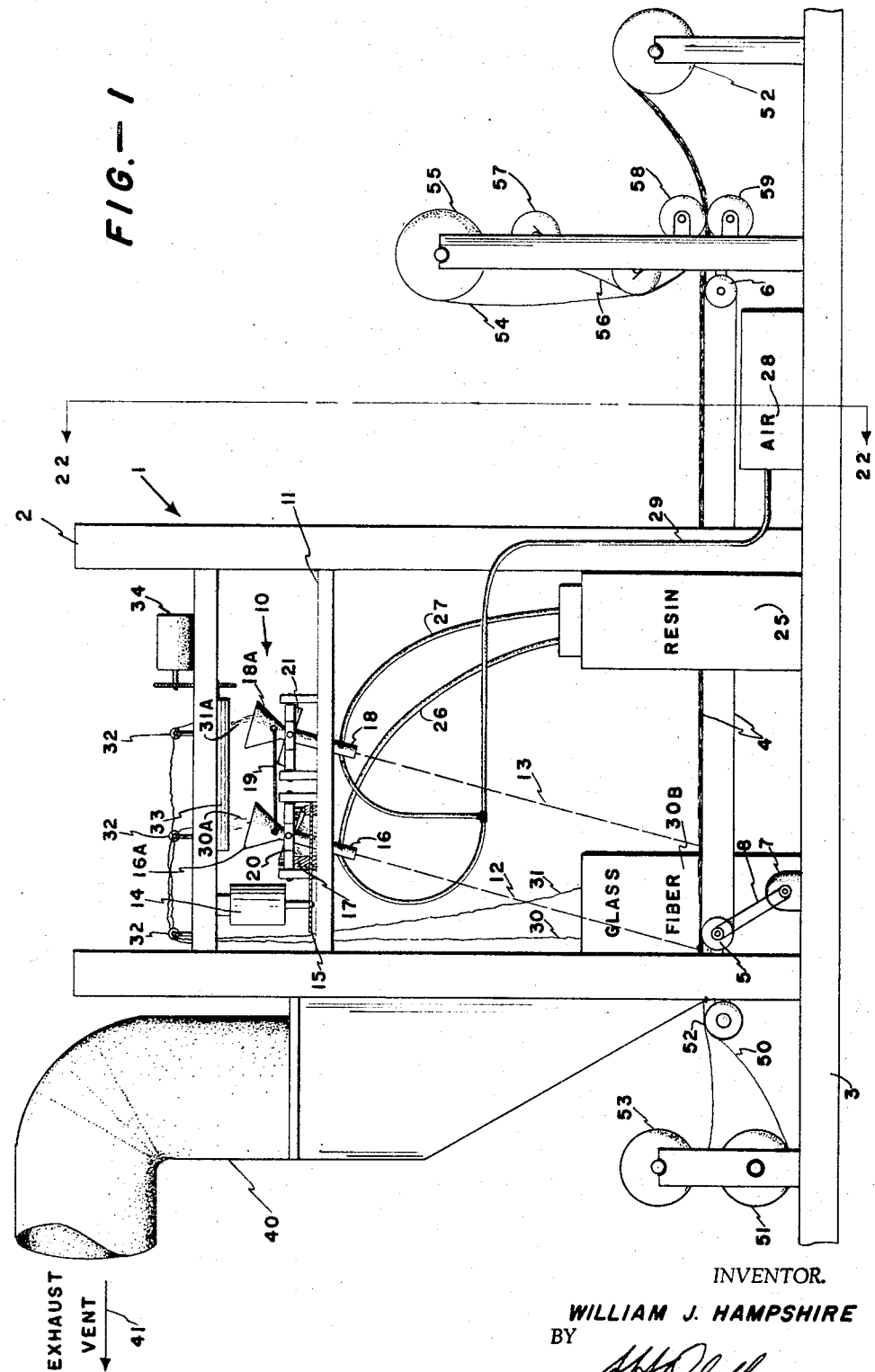
FIGURE 1 is a schematic side elevational view partially broken away of an apparatus comprising a preferred embodiment of the invention.
Figure 2:
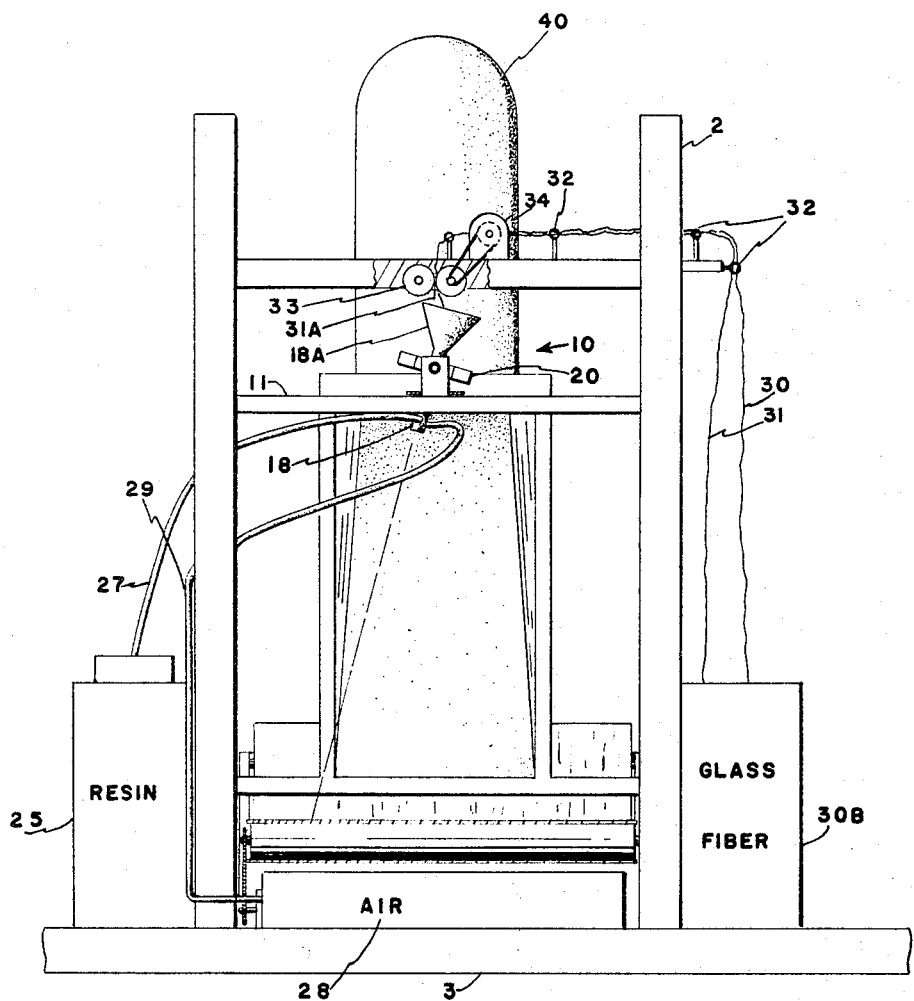
FIGURE 2 is a partially broken away end elevational view of the apparatus of FIGURE 1 taken on line 2—2 of FIGURE 1.

With reference to the form of the invention illustrated in FIGURE 1 of the drawings, the numeral 1 indicates generally an apparatus for spraying resin to form a fiber reinforced resinous material which includes a base frame 2 operatively mounted to a supporting floor 3. A substantially conventional conveyor belt 4 may be mounted to the frame 2 around rollers 5 and 6 to pass in substantially parallel relationship to the base 3. A conventional motor 7 and belt drive 8 might be provided to effect movement of the belt 4 relative to the frame 2 in a particularly desired direction. Suitable control means (not shown) might be used to regulate the speed of the motor 7.

A gimbal supported spraying nozzle assembly, indicated generally by numeral 10 is operatively mounted in fixed relationship to the base frame 2 by a connecting frame 11. The nozzle assembly 10 is adapted to direct sprayed streams of resin and glass fibers as indicated by the dotted lines 12 and 13 onto the surface of the belt 4 into particularly desired patterns, as more fully described hereinafter. In order to achieve the patterns directed by the sprayed streams 12 and 13 of the nozzle assembly 10 a motor drive 14 operating through a chain or sprocket gearing 15 rotatably drives a guide cam 17 which in turn tilts a nozzle 16 in a predetermined pattern so that material sprayed therethrough will describe a desired pattern with relation to the surface of the belt 4. A nozzle 18 is connected in slave relationship by a rod 19 to the nozzle 16 so that it will follow the tilting movements of the nozzle 16. Each of the nozzles 16 and 18 are mounted in gimbals 20 and 21, respectively so that they may be tilted in such gimbal relation in any direction to describe the desired pattern with relation to the surface of the belt 4.

In order to supply the necessary materials to the nozzles 16 and 18 to provide the spraying desired, a resin tank 25 directs connecting hoses 26 and 27 to the nozzles 16 and 18, respectively. Pressure to operate the nozzles is provided by an air tank 28 connecting to the nozzles 16 and 18 through a hose 29. A glass fiber storage 30B passes a pair of strands 30 and 31, of multiple roving glass fibers, up through guides 32 to be directed through guides 32 to be directed through a cutting mechanism 33 driven by a motor 34 with subsequent passage of the fibers cut to desired elongated lengths into the nozzles 16 and 18. A suction at the funnel-like openings 16A and 18A to each of the nozzles will draw the elongated fibers 30A and 31A from the cutter 33 as they are cut.

Suitable specific apparatus for the cutter 33 is a fiber cutter shown in my Patent No. 3,118,336 issued Jan. 21, 1964. Of course, other suitable mechanism might properly be utilized. A suitable apparatus for the nozzles 16 and 18 might be that shown in my Patent No. 2,929,436 granted Mar. 22, 1960 or my subsequent Patent No. 3,073,534, granted Jan. 15, 1963. However, other suitable nozzles which will spray resin impregnated glass fibers in substantially orientated streams or ribbons will suffice to provide the desired nozzle of the invention.

A suitable exhaust vent, indicated generally by numeral 40, might be provided to draw fumes associated with the spraying process away from the surface of the belt 4 in a direction indicated by an arrow 41.

While the invention contemplates that the material formed with the apparatus of FIGURE 1 might be formed directly onto the top of the belt 4, preferably a suitable plastic carrier film 50 might be passed over the top surface of the belt 4 from a carrying spool 51 and passed to a take up spool 52 at the opposite end of the apparatus. In order to provide a release between the material sprayed and the carrier film 50, a masking fabric of release cheesecloth or other suitable material in the form of a web 52 might be passed from a roll 53 onto the top of the film 50. Similarly, in order to protect the top of a material formed upon the belt 4 by the spraying, another release layer 54 in the form of a web might be passed from a suitable roller 55 while a top plastic carrying film 56 carried by roll 57 might be passed onto the top to provide a complete laminate. Passage of the bottom carrying films, the material sprayed by the nozzles 16 and 18 of the apparatus 1 and the top carrying film might be passed through a pair of compression rollers 58 and 59 to properly squeeze out all air pockets or otherwise compress the laminate to a desired thickness before it is passed to the take up roll 52. Generally, the use of the plastic carrying film 50 and top covering film 56 will just be for manufacture and storage of the material formed as during actual use, these films will be peeled off along with the release layers to allow the glass fiber reinforced material to be used separately.

FIGURE 3 illustrates more clearly the specific relationship of the gimbal mounting and cam drive for the nozzle 16. More specifically, the motor 14 drives through a gear reducer 60 which may in turn drive through an oscillator compensator 61 to turn a sprocket gear 62. The cam 17 is rotatively mounted by an annular bearing 63 operatively carried in the mounting frame 11. Hence, a sprocket gear around the circumference of the cam 17 allows a chain 64 to pass around the sprocket gear 62 and the sprocket gear of the cam 17. Thus, rotative movement of the sprocket gear 62 operatively rotates the cam 17 through the chain-link drive 64.

The gimbal mounting for the nozzle 16, as better seen in FIGURE 4, comprises the outer gimbal 20 which is rotatively mounted by shafts 65 and 66 at opposed ends thereof to mounting posts 67 and 68, respectively. A spider ring 69 has diametrically opposed shafts 70 and 71 pivotally mounted into the gimbal 20. Thus, a true gyroscopic gimbal arrangement is achieved between the gimbal 20 and the spider 69. The nozzle 16 is operatively mounted in fixed relationship to the center of the spider 69. In 90° relationship to the shafts 70 and 71 and diametrically opposed to each other are shafts 72 and 73 extending from the equally 90° spaced arms of the spider 69. In order to adapt tilting movement to the spider 69 by means of the cam 17, each of the shafts 70 through 73 of the spider 69 has a roller 70A through 73A rotatively mounted thereon in a pivotal relationship because of the ball and socket type mounting thereof, as more clearly seen in FIGURE 4. The ball and socket type pivotal arrangement of each roller 70A through 73A allows it to pivot and thus be in substantially planar relationship with the annular path of the cam 17 and always fully in contact therewith during the rotative movement of such cam 17. Thus, it should be understood that as the cam 17 rotates, because of its angularly directed top surface, as indicated by numeral 75 in FIGURE 3, the discharge end 16B of the nozzle 16 will be tilted or swung through a substantially square or diamond-shaped path in relation to the belt 4. The bottom inside surface of the cam 17 is cut away on a funnel type bevel, as at 76 to permit the desired tilting movement of the nozzle 16 without engaging the inside surface of the cam 17. FIGURE 3 actually illustrates the nozzle 16 at its maximum forward tipped position.

FIGURE 5 illustrates a vertical cross sectional view of the cam 17, and shows more clearly the beveled funneled bottom inner surface 76, as well as the sprocket gearing 77 around the outer circumference of a lip 78. It should be noted that the top surface 17A of the cam 17 is not cut exactly on a single plane, but rather follows a rather spiral shape so that such top surface 17A is substantially perpendicular to the center line axis of the cam 17. Thus, the rollers 70A through 73A associated with the spider 69 will always be in a substantially vertical plane as they roll around the surface 17A of the cam 17 during the rotation thereof. Ordinarily, the invention contemplates that the cam 17 will be machined from a suitable steel, and formed with a hardened cam surface 17A. Of course, the surface or profile of the cam might be appropriately altered to move the nozzle through any other desired path during the spraying of the material onto the surface of the belt 4.

Figure 6:
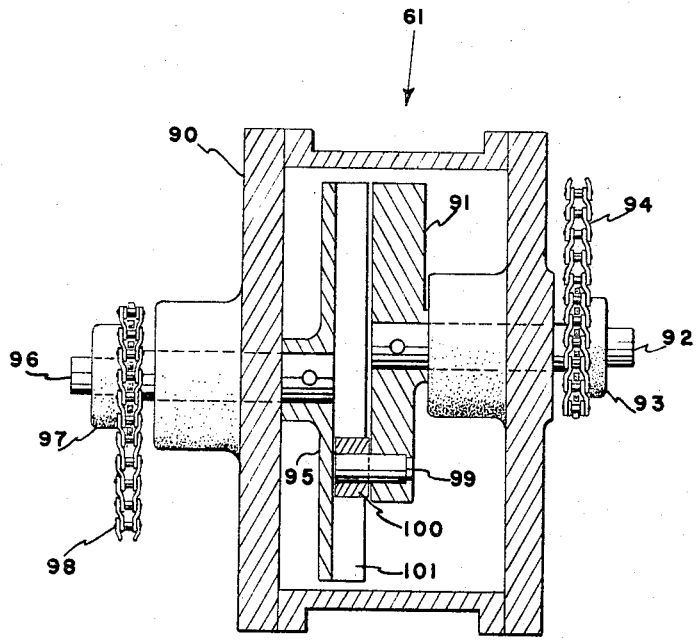
FIGURE 6 is an enlarged partially broken away view of the oscillator compensator shown in block form in FIGURE 3.
Figure 6A:
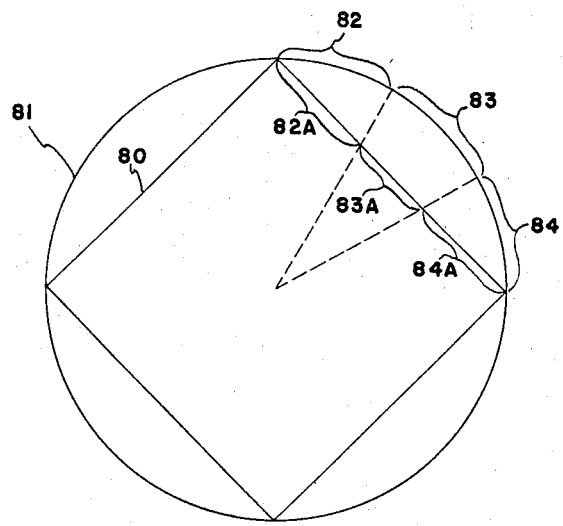
FIGURE 6A is a schematic illustration of the movement problem solved by the compensator of FIGURE 6.

It should be understood that the cam 17 having the cam surface 17A will direct the nozzle 16 and the nozzle 18, connected in a slave relationship thereto, in a substantially diamond-shaped path, as indicated by numeral 80 in FIGURE 6A. If the cam 17 were rotated at a constant angular speed, it would essentially define the circle 81 defining the path 80 in FIGURE 6A. Thus, it can be readily seen that even though the angular segments 82, 83 and 84 are equal arcs of the circle 81, they will not represent equal portions 82A, 83A, and 84A in the path 80 defined by the cam 17. In other words, a constant angular rotation to the cam 17 will cause the nozzle 16 to move at a faster angular speed through those areas 82A and 84A as seen in FIGURE 6A, whereas the nozzle will move at a slower angular speed throughout the area 83A as seen in FIGURE 6A. This difference in angular speed caused by a uniform relative circular motion to the cam will cause an uneven buildup of the material formed on the surface of the belt 4. Such uneven buildup is not desirable.

Figure 7:
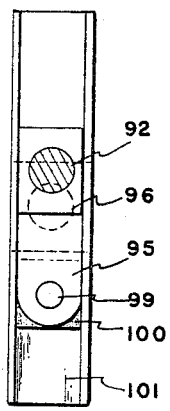
FIGURE 7 is a plan view of the offset crank relationship in the maximum drive position as utilized with the oscillator compensator of FIGURE 6.
Figure 7A:
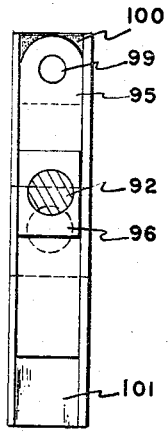
FIGURE 7A is a view similar to FIGURE 7, but showing the crank in minimum drive relation.
Figure 8:
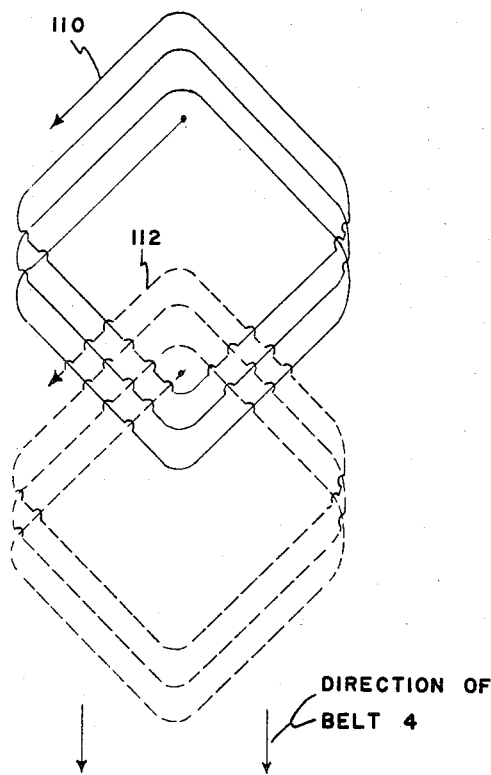
FIGURE 8 is a schematic illustration of the interrelationship of the diamond-shaped patterns which might be sprayed by the apparatus of FIGURES 1 and 2.

Hence, in order to correct the situation, the oscillator compensator 61 shown in FIGURE 3 is provided. FIGURE 6 represents an enlarged operative view of such compensator 61. Essentially, the compensator 61 consists of a frame 90 which rotatably mounts a crank 91 affixed to a shaft 92 and driven by a sprocket 93 connected to a chain drive 94. A crank slide 95 is rotatably mounted in offset relation to crank 91 by shaft 96 and this shaft drives a sprocket gear 97 to move a chain drive 98 which would normally be the chain drive associated with the sprocket gear on the cam 17 to control the movement of the nozzles 16 and 18. In this mechanical set up, the crank 91 has a fixed pin 99 operatively mounted at a spaced radial distance from the shaft 92. The pin 99 mounts a rotatable guide 100, as best seen in FIGURE 7, which is slidably received in an elongated groove 101 in crank slide 95. Thus, it should be understood that as shaft 92 rotates crank 91 the pin 99 operatively connecting to the crank slide 95 through the guide 100 will cause a rotation of crank slide 95. However, because of such eccentric or offset relationship between the shafts 92 and 96, the rotative speed of crank slide 95, although making one revolution for each revolution of crank 91 will rotate faster during some portions of its revolution and slower during other portions. More specifically, as seen in FIGURE 7, with crank 91 at the position indicated relative to crank slide 95, the pin 99 is at the closest radially displaced distance from shaft 96 so that in this position, rotation of crank 91 causing angular rotation of pin 99 will cause angular rotation to crank slide 95 at a greater rotational speed. Conversely, when the crank and crank slide are in the opposite relationship, as indicated by FIGURE 7A, the pin 99 will be at the greatest radial displacement from the mounting shaft 96 and hence angular rotation of crank 91 will cause an angular rotative movement of crank slide 95 at a lesser speed.

Thus, it should be understood with the crank 91 and crank slide 95 starting in the relative position indicated in FIGURE 7 that one complete revolution of crank 91 will cause one complete revolution of crank slide 95, however crank slide 95 will start out rotating faster than crank 91, slow down as it passes towards 180° to rotate slower, and then back up to faster rotation until the one revolution has been completed. To properly utilize this mechanical feature the compensator might appropriately be designed to make one full revolution of the crank 91 and crank slide 95 for ¼ revolution of the cam 17. However, the drive must be so defined that the crank and crank slide will be in the relationship indicated by FIGURE 7 at each corner or change in directional movement of the nozzles 16 and 18 to define the square or diamond-shaped patterns 80 as indicated in FIGURE 6A. Thus, it should be understood that the inclusion of the compensator 61, as more fully defined above with reference to FIGURE 6, will insure that the deposit of sprayed material onto the surface of the belt 4 by the nozzles 16 and 18 will be completely evenly dispersed to eliminate air pockets, uneven density throughout the material, and other undesirable buildup characteristics.

It should be clearly understood that the slave bar or rod 19 in FIGURE 1, is attached to each of the nozzles 16 and 18 to allow pivotal movement only in the plane of the nozzles. This relationship effectively allows nozzle 18 to follow the movements of nozzle 16. Further, while the invention has only illustrated two nozzles, it should be understood that any number of nozzles provided with any desirable pattern could be utilized by incorporating cams with different surface configurations and various slave bar relationships.

FIGURE 8 illustrates the possible interrelated pattern achieved by the nozzles 16 and 18 as controlled by the diamond or square-shaped pattern provided by the cam 17. Essentially, nozzle 16 will follow a path 110 while nozzle 18 will follow a path 112. It can easily be seen, by following the paths 110 and 112 which are designed to sequentially advance in similar increments because of the relative movement of the belt 4 timed in combination with the relative movement of the nozzles achieved by the cam 17, that such movements will provide a series of interrelated diamond-shaped patterns going over and under each other to achieve a desired fabric-like consistency to the material sprayed. The fabric-like consistency is further achieved because by far the majority of fibers laid down in the resin streams sprayed by the nozzles will substantially orientate to the path defined by the nozzles. For a more specific description of the interrelationship of the material formed by the apparatus described herein, reference should be had to my above-identified patent application on "Fiber Reinforced Material and Method for Making Thereof."

Thus, it is seen that the objects of the invention have been achieved by providing an apparatus for spraying resin having glass fibers intermixed therewith and substantially aligned in the ribbons of sprayed resin. The spraying is from a plurality of nozzles onto a moving conveyor belt where the nozzles are directed in their movement by a control cam which rotates at a controlled speed by an oscillator compensator to provide uniform movement of the nozzles insuring an even build up of criss-crossed ribbons and layers of resin to achieve a uniform laminate having fabric-like consistency. While only one specific relationship of the nozzles and oscillator compensator have been defined, it should be understood that various relationships of the nozzles moving in the same paths, or different paths at the same, or different speeds to provide different interrelated patterns onto a moving conveyor belt might easily be achieved.

The invention as described above has set forth apparatus designed in a manner to deposit resin and glass fibers simultaneously in a controlled pattern by spraying continuous ribbon-like bands of material directed in interlaced diamond-shaped patterns under controlled conditions, upon a moving belt or collecting surface. Obviously, if the surface does not move, the nozzles could be moved relative to the surface, as well as in their relative patterns. The apparatus described hereinabove can be utilized with normal resin, epoxies, foaming resins, or any suitable material which may be sprayed in association with cut fibers of desired lengths or density to achieve an interlaced or interrelated material having fabric-like consistency. Further, it should be understood that the speed of the glass fiber cutter might be appropriately varied, or the number of strands fed into each nozzle appropriately varied to thereby control the consistency, length, and number of glass fibers interspersed with the resin as laid down in the ribbons by the nozzles.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In an apparatus for forming fiber reinforced material the combination of a base frame, a conveyor belt operatively mounted to the base frame,
means to move the conveyor belt relative to the base frame,
nozzle means,
gimbal mounting means operatively secured to the frame and mounting the nozzle means in gimbal relationship over the conveyor belt,
means to supply resin under pressure to the nozzle means,
means to supply air under pressure to the nozzle means,
means to supply selectively cut elongate lengths of glass fibers to the nozzle means, and
means to controllably move the nozzles relative to the conveyor belt while the belt is being moved relative to the base frame to direct ribbons of resin having elongated glass fibers therein along continuously advancing similar diamond-shaped patterns to lay a substantially flat layer of intermixed resin and fibers on the conveyor belt.

2. An apparatus according to claim 1 where the means to controllably move the nozzles include annular cam means mounted in rotatable relation to the frame and surrounding at least one of the nozzles, cam followers rotatably mounted to the gimbal mounting means and engaging the cam, means to rotate the cam whereby the cam followers following the cam contour tilt said nozzles in their gimbaled mountings so as to continuously describe similar geometric paths with the nozzle tips, and slave rod connections from the cam directed nozzles to all other nozzles.

3. In an apparatus for forming fiber reinforced material the combination of
a base frame,
a conveyor belt operatively mounted to the base frame in a substantially horizontal plane,
means to move the conveyor belt relative to the base frame,
nozzle means having spray tips,
gimbal mounting means operatively secured to the frame and mounting the nozzle means in gimbal relationship over the conveyor belt,
means to supply resin under pressure to the nozzle means,
means to supply air under pressure to the nozzle means,
means to supply selectively cut elongated lengths of glass fibers to the nozzle means,
annular cam means mounted in rotatable relation to the frame and surrounding the nozzle means,
cam followers rotatably mounted to the gimbal mounting means and engaging the cam means,
means to rotate the cam means whereby the cam followers following the cam contour tilt the nozzle means in their gimbaled mounting to direct the nozzle tips relative to the conveyor belt while the belt is being moved relative to the base frame to direct ribbons of resin having elongated glass fibers therein along continuously advancing similar geometric shape pattern to lay a substantially flat layer of intermixed resin and fibers on the conveyor belt.

4. An apparatus according to claim 3 where the surface of the cam means is substantially perpendicular to the axis thereof and the cam followers are pivotally mounted in relation to the gimbal mounting means whereby they may properly follow and remain in full engagement with the cam means during the rotation thereof.

5. An apparatus according to claim 3 wherein means are provided to vary the rotating drive to the cam means to properly insure that the nozzle tips will move at the same speed along every portion of the perimeter defining the geometric path through which they are directed by the cam means.

6. In an apparatus for making glass fiber resinous reinforced material the combination of
a surface adapted to receive a sprayed mixture of glass fibers and resins,
a plurality of nozzle means operatively mounted in spaced relation over the surface,
gimbal mounting means operatively mounting the nozzle means in gimbal relationship over the surface,
means to supply resin and elongate glass fibers to the nozzle means and to spray deposit a mixture therefrom in directional streams having the elongated glass fibers impregnated with resin and substantially oriented in the direction of the streams,
means to continuously and simultaneously direct at least two of the nozzle means in longitudinally spaced, similar predetermined closed geometric paths without changing the relative relation of each nozzle to each other and the surface to deposit the mixture in predetermined closed geometric patterns on the surface, and
means to simultaneously with the directional movement of the nozzles move the surface in parallel spaced relation to the nozzle means at a continuous relative speed whereby the geometric patterns of mixture from at least said two nozzles overlap and become interrelated in a criss-crossed relationship to define a glass fiber reinforced material having a fabric-like consistency.

7. An apparatus according to claim 6 where such means to continuously direct the nozzles in similar predetermined geometric path include further means to insure that the movement of the nozzles is at a uniform speed throughout the length of the geometric paths so that the patterns deposited on the surface will be of uniform thickness.

8. In an apparatus for making glass fiber resinous reinforced material the combination of
a surface adapted to receive a sprayed mixture of glass fibers and resin,
a plurality of nozzle means operatively mounted in spaced relation over the surface,
means to supply resin and elongate glass fibers to the nozzle and to spray deposit a mixture therefrom in thin directional streams having the elongated glass fibers impregnated with resin and substantially oriented in the direction of the streams,
annular cam means mounted to the frame in rotatable relation surrounding at least one of the nozzle means,
cam followers rotatably mounted to the nozzle means and engaging the cam means,
means to rotate the cam means whereby the cam followers following the cam means tilt said nozzle means in their gimbaled mountings so as to continuously describe similar geometric paths with the nozzle tips,
slave rod connections from the cam directed nozzle means to all other nozzles, and
means to simultaneously move the surface in parallel spaced relation to the nozzle means at a continuous relative speed whereby the geometric patterns of material deposited by the nozzles overlap and become interrelated in a crisscrossed relationship to define a glass fiber reinforced material having a fabric-like consistency.

9. An apparatus according to claim 8 where such means to continuously direct the nozzles in similar predetermined geometric path include further means to insure that the movement of the nozzles is at a uniform speed throughout the length of the geometric paths so that the patterns deposited on the surface will be of uniform thickness.

References Cited

UNITED STATES PATENTS

| | | | |
|---|---|---|---|
| 2,933,125 | 4/1960 | Anderson | 156—370 XR |
| 3,107,183 | 10/1963 | Way et al. | 118—323 |
| 3,184,328 | 5/1965 | Wagner et al. | 118—323 |

EARL M. BERGERT, *Primary Examiner.*

W. E. HOAG, *Assistant Examiner.*